United States Patent
Boulton

(10) Patent No.: US 11,388,192 B2
(45) Date of Patent: Jul. 12, 2022

(54) MANAGING THIRD PARTY URL DISTRIBUTION

(71) Applicant: BlackBerry Limited, Waterloo (CA)

(72) Inventor: Adam John Boulton, Wirral (GB)

(73) Assignee: Blackberry Limited, Waterloo (CA)

( * ) Notice: Subject to any disclaimer, the term of this patent is extended or adjusted under 35 U.S.C. 154(b) by 323 days.

(21) Appl. No.: 16/030,420

(22) Filed: Jul. 9, 2018

(65) Prior Publication Data
US 2020/0014721 A1    Jan. 9, 2020

(51) Int. Cl.
*H04L 29/06* (2006.01)
*H04L 9/40* (2022.01)

(52) U.S. Cl.
CPC ...... *H04L 63/1483* (2013.01); *H04L 63/0884* (2013.01)

(58) Field of Classification Search
CPC ............. H04L 63/1483; H04L 63/0884; H04L 63/168; H04L 63/12
See application file for complete search history.

(56) References Cited

U.S. PATENT DOCUMENTS

| | | | | |
|---|---|---|---|---|
| 7,233,989 B2 * | 6/2007 | Srivastava | ............ | G06F 11/326 709/223 |
| 7,769,820 B1 * | 8/2010 | Spies | ...................... | H04L 63/08 709/218 |
| 7,996,713 B2 * | 8/2011 | Hanna | ................. | H04L 41/0806 714/10 |
| 8,677,481 B1 * | 3/2014 | Lee | ...................... | H04L 63/1416 726/22 |
| 2005/0268100 A1 * | 12/2005 | Gasparini | ............. | H04L 63/168 713/170 |
| 2006/0206728 A1 * | 9/2006 | Masuda | .................. | H04L 9/321 713/193 |
| 2008/0201401 A1 * | 8/2008 | Pugh | ................. | H04L 29/12349 709/201 |
| 2009/0119402 A1 * | 5/2009 | Shull | ................... | H04L 63/1491 709/224 |
| 2010/0122327 A1 * | 5/2010 | Linecker | ............... | H04L 63/168 726/6 |
| 2014/0130162 A1 | 5/2014 | Kim et al. | | |
| 2016/0103801 A1 * | 4/2016 | Bortz | .................... | G06F 40/134 715/205 |
| 2017/0034023 A1 * | 2/2017 | Nickolov | ............ | H04L 43/0817 |

(Continued)

FOREIGN PATENT DOCUMENTS

WO    2012094040 A1    7/2012

OTHER PUBLICATIONS

International Search Report and Written Opinion of International Searching Authority in PCT/EP2019/064718 dated Aug. 7, 2019, 13 pages.

*Primary Examiner* — Carl G Colin
*Assistant Examiner* — Hany S. Gadalla
(74) *Attorney, Agent, or Firm* — Blackberry Limited

(57) ABSTRACT

A verification server comprising a memory and a processor programmed to execute instructions stored in the memory. The instructions include receiving a link registration request including a third-party link to a third-party server, validating the third-party server as a result of receiving the link registration request, generating a unique code as a result of validating the third-party server, and generating a custom link that includes the unique code.

17 Claims, 2 Drawing Sheets

(56) References Cited

U.S. PATENT DOCUMENTS

| | | |
|---|---|---|
| 2018/0012184 A1 | 1/2018 | Shraim et al. |
| 2018/0084002 A1* | 3/2018 | Shnitzer ................ H04L 63/168 |
| 2019/0028270 A1* | 1/2019 | Foisy .................... G08B 29/12 |
| 2019/0260797 A1* | 8/2019 | Yun ..................... H04L 63/1425 |

* cited by examiner

MANAGING THIRD PARTY URL DISTRIBUTION

BACKGROUND

"Phishing" is a term used to describe malicious attempts to electronically capture sensitive information. Phishing attacks are often carried out through email communications. The data thief will send an email to the victim that appears to be from a trusted source. The email may contain malware or links to legitimate-looking websites that attempt to capture the victim's sensitive information such as username and password, credit card information, or other personal information. The data thief uses the sensitive information for monetary gain, identity theft, or both.

DETAILED DESCRIPTION

Figure 1:
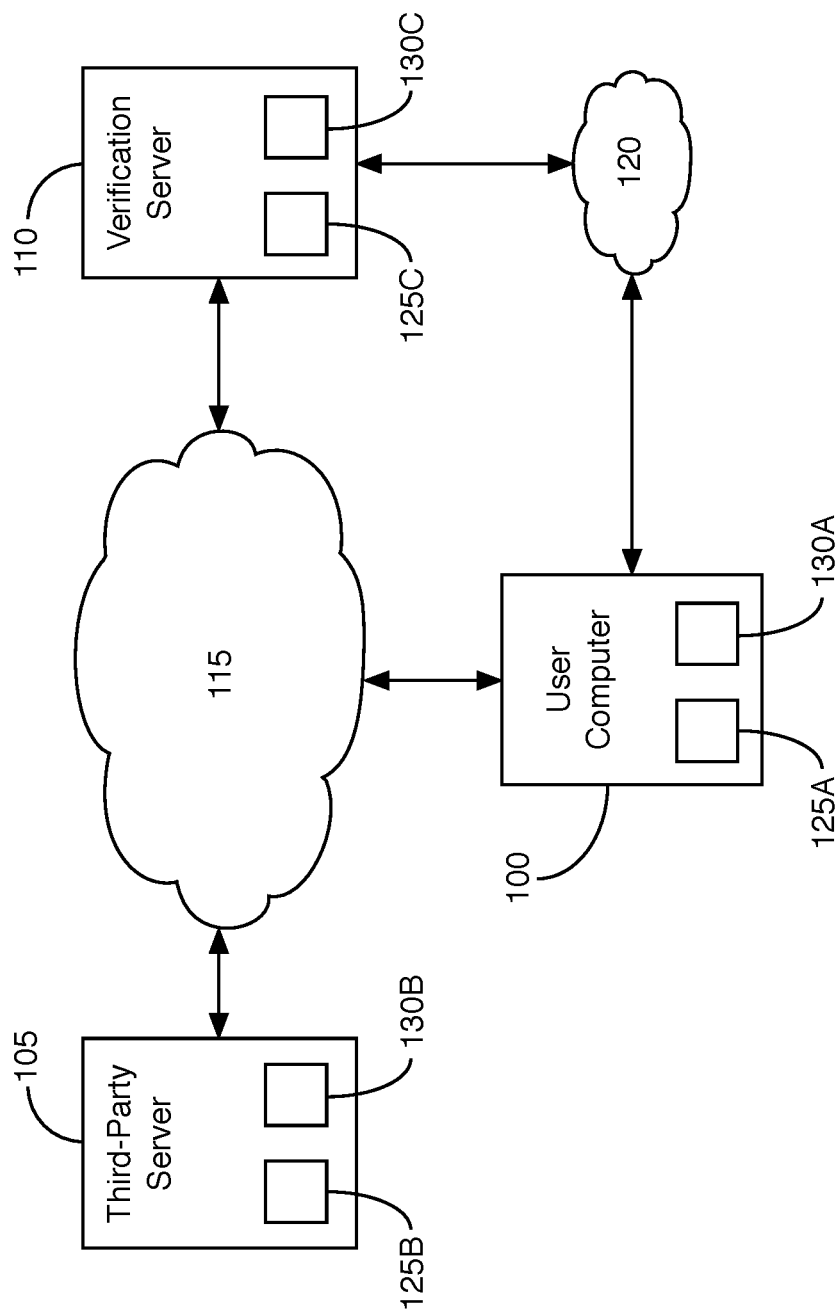
FIG. 1 illustrates an example system having a verification server for registering and verifying links to third-party servers.

Data thieves are becoming more sophisticated with how they carry out phishing attacks. That makes it harder for the average consumer to recognize a phishing attack until it is too late. Falling for a phishing attack can cause significant issues for the victim, the victim's employer if the phishing attack occurred on a computer connected to the employer's network, or both. Besides identity theft, phishing attacks often result in significant financial losses for the victim and sometimes the victim's employer. Moreover, a successful phishing attack on a corporate network can sometimes expose the corporate network to the data thief.

To reduce the risk of a successful phishing attack, many corporations train employees to recognize phishing attacks. That training involves teaching employees to confirm the source of an email before clicking links or opening attachments embedded in the email. An unintended consequence of employee training programs meant to counteract phishing attacks is an increased level of distrust of legitimate emails, especially when the legitimate email includes a link to a third-party website, has an attachment, and/or asks the employee to provide personal information. The sender of the legitimate email is often required to send follow-up emails explaining that the legitimate email is indeed legitimate.

One way to reduce the likelihood that employees will fall for phishing attacks while also helping employees know which internal emails to trust is to implement a uniform resource locator (URL) verification server. The verification server verifies that third-party URLs (i.e., URLs pointing to third-party websites) in emails can be trusted by employees. That is, the URL verification server has a memory and a processor programmed to execute instructions stored in the memory. The instructions include receiving a link registration request including a third-party link to a third-party server, validating the third-party server as a result of receiving the link registration request, generating a unique code as a result of validating the third-party server, and generating a custom link that includes the unique code.

The following describes an example implementation of the URL verification server used to improve trust and reduce phishing attacks on internally issued emails (e.g., corporate emails sent to others in the corporation). An employee or trusted user can access a URL management portal running on the verification server. The URL management portal may be accessed via the user's computer when the user's computer is connected to the company network. The URL management portal may be protected from outside access, that is, access outside the company network. The URL management portal may allow the user to enter a link to a third-party server for purposes of registering the third-party link. The verification server performs security tests on the third-party server to confirm whether the third-party server complies with the company's policies. For example, the verification server may perform checks on the transit capabilities (SSL/TLS tests), confirm that the data sent by the third-party server is not sent via plaintext, verify the domain and certificate information, etc. The URL management portal may further permit the user to configure other parameters such as defining the lifetime of the link (i.e., setting an automatic expiration of the link) or whether to generate a landing page. The authenticated user can also generate a unique code for the link to the third-party server. The unique code may replace the URL. For example, the unique code for http://www.uspto.gov may be "nw57VI7o3ZZNM4." The verification server may generate a custom link that can be distributed via internal emails from the unique code. The custom link may act as a proxy to redirect email recipients who click on the custom link to the third-party server or to the landing page. The custom link may include a trusted domain plus the unique code. The trusted domain may be the domain associated with the entity that manages the verification server. Thus, the custom link may be "https://redirect.blackberry.com/nw57VI7o3ZZNM4" since employees of BlackBerry Limited will recognize "blackberry.com" as a trusted domain.

This implementation reduces issues with employees mistrusting legitimate emails and links in those emails. Further, this implementation allows the verification server to confirm that the third-party server complies with particular protocols and policies before employees are invited to click links directing them to the third-party server. Also, because the link to the third-party server is hidden behind the unique code, the user is less likely to bypass the security checks by navigating directly to the third-party server. The implementation further provides auditing capabilities. That is, the implementation allows the verification server to keep access logs with timestamps to, e.g., track changes to the landing page, determine which employees clicked the custom link, determine when employees visited the landing page or accessed the third-party server, etc.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

FIG. 1 illustrates a user computer 100, a third-party server 105, and a verification server 110 in communication via a communication network 115. The communication network 115 includes components that facilitate communication between electronic devices. The communication network 115 may include components that permit wired communication, wireless communication, or a combination of both. In one possible approach, the communication network 115 is a packet switched network such as the internet. Alternatively, the communication network 115 may be implemented via a telecommunication network 115 such as a cellular network, a satellite network, or the like. The communication network 115 may facilitate communication in accordance with any number of wired or wireless communication protocols.

The user computer 100 is implemented via circuits, chips, or other electronic components that can communicate over the communication network 115. The user computer 100 may be programmed to receive electronic communications, transmit electronic communications, visit websites, etc., over the communication network 115. Thus, the user computer 100 may have applications installed such as an email application, a web browser, or both. When using the user computer 100, the user may receive emails, transmit emails, visit websites using the web browser, etc. The user computer 100 may allow the user to visit websites by typing a uniform resource locator (URL) into the browser or by clicking a link containing the URL in an email. By doing so, the web browser installed on the user computer 100 may present content associated with the link for presentation on a display of the user computer 100. The link may be transmitted via the communication network 115, and the user computer 100 may receive the content associated with the link via the communication network 115.

In some instances, the email application of the user computer 100 may be programmed to generate electronic communications (i.e., emails) with links to the third-party content stored on the third-party server 105. In doing so, the user computer 100 may allow the user to register the link to the third-party server 105 with the verification server 110 by logging into a URL management portal. The registration process may involve the user computer 100 transmitting a registration request to the verification server 110 via a private network 120 (e.g., a local area network managed by the same entity that manages the verification server 110 and the user computer 100) or the communication network 115. As a result of the registration process, the email application of the user computer 100 receives a custom link that may be included in an email. The custom link is different from the third-party link (i.e., the URL for the content stored at the third-party server 105) but will redirect to the third-party link when clicked in the email. In some instances, the email application may prevent users from sending emails with non-registered links.

The third-party server 105 is implemented via circuits, chips, or other electronic components that allow the third-party server 105 to host content such as website data, databases, applications, etc. The third-party server 105 may make the content available via the web browser of the user computer 100 in response to a request from the user computer 100. The request for the content may be in the form of the user computer 100 transmitting the link associated with the third-party server 105, the content stored on the third-party server 105, or both, to the third-party server 105 via the communication network 115. The third-party server 105 may receive the request for content over the communication network 115 and transmit the content to the user computer 100 over the communication network 115.

The verification server 110 is implemented via circuits, chips, or other electronic components that can verify that the third-party server 105 can be trusted. That is, the verification server 110 verifies that the third-party server 105 is managed by a trusted entity and that the third-party server 105 complies with various security protocols and policies. For instance, the verification server 110 may be programmed to confirm that the third-party server 105 has the appropriate security certificates, encrypts sensitive data, does not contain malware, etc. At a high level, the verification server 110 confirms that the third-party server 105 provides the content it purports to provide. The verification server 110 may be further programmed to monitor the third-party server 105 over time, even after completing the registration process, to determine whether the third-party server 105 has been compromised (e.g., subject to a malicious hack or under the control of a non-trusted entity). If so, the verification server 110 may revoke the registration and possibly prevent the user computer 100 from accessing content stored on the third-party server 105.

The verification server 110 may be programmed to validate the third-party server 105 as a result of receiving the registration request received from the user computer 100 via the private network 120 or the communication network 115. The registration request may include the third-party link, which as discussed above is the link to the third-party server 105 that the user wishes to include in an email. The verification server 110 verifies that the third-party server 105 is managed by a trusted entity and that the third-party server 105 complies with various security protocols and policies as a result of receiving the registration request.

After verifying that the third-party server 105 identified in the third-party link, the verification server 110 may be programmed to create a landing page for the third-party link. The landing page may be managed by the verification server 110 (or an entity associated with the verification server 110). The landing page may include details about the entity that manages the third-party server 105, links to the third-party server 105, and possibly other information. The landing page may be updated by, e.g., the user, the verification server 110, or both. For instance, the verification server 110 may update the landing page as a result of determining that the information about the third-party server 105, the links to the third-party server 105, etc., have changed since the landing page was created or last updated. For instance, the landing page may be updated as a result of the verification server 110 determining that the third-party server 105 has a new security certificate, has changed its compliance with various security protocols or policies, or the like. The user may manually update the landing page via the user computer 100 to provide certain information to anyone who visits the landing page. For example, the user may manually update the landing page to include information about the links to the third-party server 105 contained on the landing page, information about the entity that manages the third-party server 105, instructions for using the landing page, the third-party server 105, or both, or the like.

By putting information and third-party links on the landing page (as opposed to simply typing the information and links in emails), information appearing on the landing page may be updated without the user having to send subsequent emails correcting information sent via earlier emails. Moreover, third-party links can be removed from the landing page as a result of the verification server 110 determining that the third-party link is no longer valid (e.g., the link no longer complies with security protocols and policies, the third-party server 105 is no longer managed by a trusted entity, etc.). Because the links are not included in the emails, email recipients will not see and inadvertently click on links that are no longer valid. In some instances, however, the verification server 110 may still block the domain associated with the invalid third-party link to further prevent inadvertent communications with the third-party server 105.

The verification server 110 may be programmed to generate a custom link to the third-party server 105 or to the landing page. The verification server 110 may be programmed to generate a unique code for the third-party link. The unique code may include any one or more of numbers, letters (uppercase and/or lowercase), and special characters. The unique code may be randomly generated (e.g., the verification server 110 may randomly select a combination of numbers, letters, and/or special characters) of a predetermined length (i.e., a predetermined number of characters) or may be a function of the third-party link (i.e., the verification server 110 may apply a cryptographic function to the third-party link and use the output of the function as the unique code). After generating the unique code, the verification server 110 may generate the custom link that directs the user to the third-party server 105. The custom link may be based on or otherwise include the unique code. In addition, the custom link may include the domain of the entity that manages the verification server 110 but not the domain of the third-party server 105. In other words, the third-party server 105 may be associated with one domain (a "first domain") and the custom link may have a "second domain" such as a domain associated with the entity that manages the verification server 110. The first domain and second domain are different from one another.

The verification server 110 may send the custom link to the user computer 100 so the user may embed the custom link in an email. As a result, the custom link will show a domain that is familiar to the user (e.g., it will be the domain of the user's employer or another entity the user trusts) but points to the third-party server 105 or landing page. That is, the custom domain will redirect web traffic to the third-party server 105 or to the landing page when clicked. With this approach, the email recipients will recognize the custom link in the email as originating from a source the verification server 110 has verified, giving the email recipient confidence that the email and the custom link are legitimate (e.g., not spam or part of a phishing attack).

The verification server 110 may be further programmed to provide auditing capabilities. That is, the verification server 110 may generate access logs with timestamps to, e.g., track changes to the landing page, determine which employees clicked the custom link, determine when employees visited the landing page or accessed the third-party server 105, etc.

The user computer 100, third-party server 105, and verification server 110 may each include a memory 125 and a processor 130. Each memory 125 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 125A of the user computer 100 may store instructions executable by the processor 130A of the user computer 100 and data such as data used to create and send the registration request to the verification server 110, data used to send the custom link via email to email recipients, etc. The memory 125 of the third-party server 105 may store instructions executable by the processor 130B of the third-party server 105 and data such as security certificates, information about the entity that manages the third-party server 105, website data, etc. The memory 125C of the verification server 110 may store instructions executable by the processor 130C of the verification server 110 and data such as the registration request received from the user computer 100, the unique code, the custom link, etc.

Each processor 130 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. Each processor 130 is programmed to execute instructions stored in the memory 125. For example, the processor 130A of the user computer 100 is programmed to execute instructions stored in the memory 125A to carry out the operations of the user computer 100 discussed above. The processor 130B of the third-party server 105 is programmed to execute instructions stored in the memory 125B to carry out the operations of the third-party server 105 discussed above. The processor 130C of the verification server 110 is programmed to execute instructions stored in the memory 125C to carry out operations of the verification server 110 discussed above.

Figure 2:
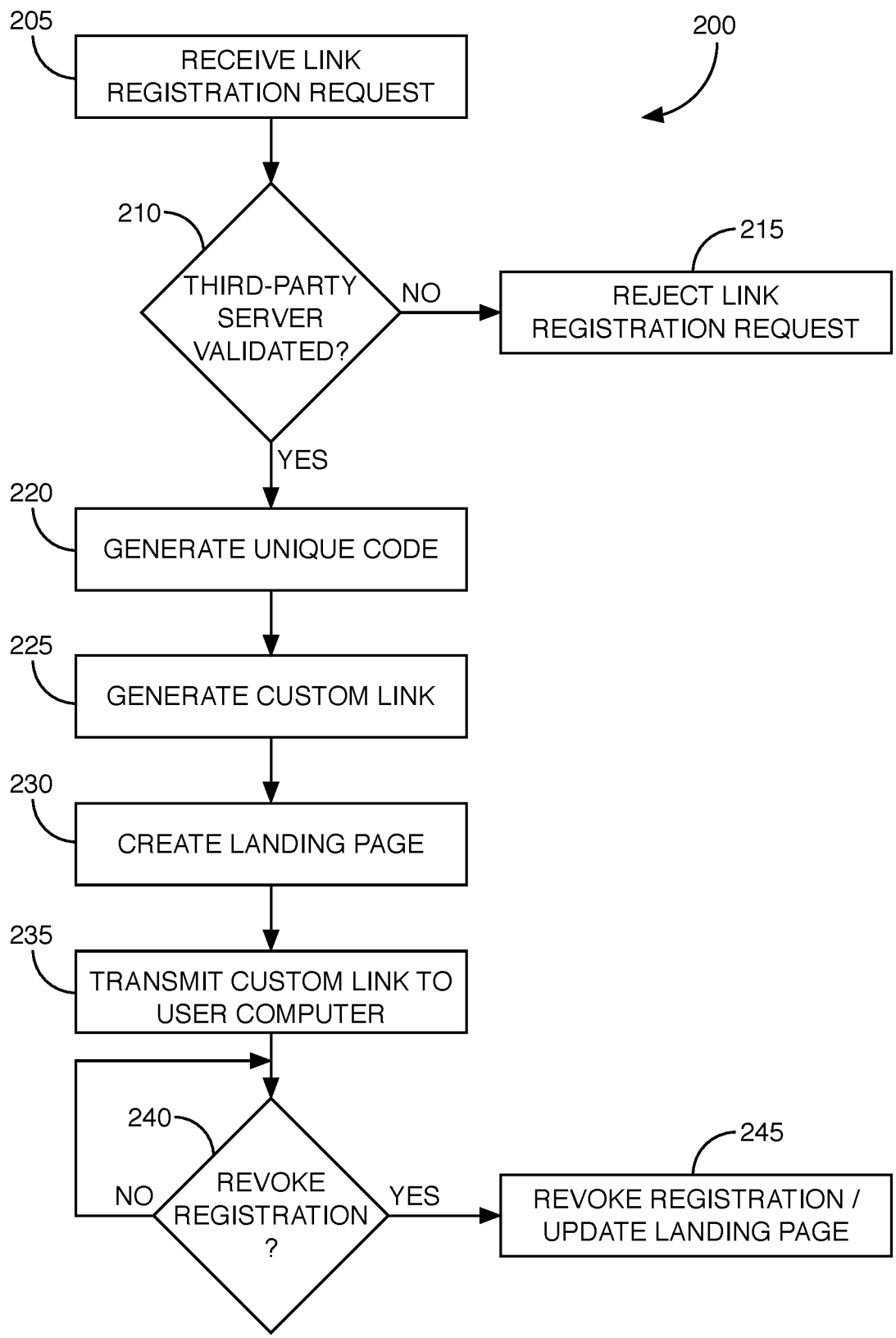
FIG. 2 is a flowchart of an example process that may be executed by the verification server shown in FIG. 1.

FIG. 2 is a flowchart of an example process 200 that may be executed by one or more components of the verification server 110. For instance, the process 200 may be executed by the processor 130C. The process 200 may be initiated when, e.g., the user of the user computer 100 wishes to include a third-party link (i.e., the URL to the third-party server 105) in an email. The entity managing the verification server 110 may require employees to register links to third-party servers 105 prior to including the link in an email sent from the user computer 100, via a corporate email server, or the like.

At block 205, the verification server 110 receives the link registration request from the user computer 100. The verification server 110 may receive the registration request via the communication network 115. The registration request may include a third-party link (i.e., a URL to a third-party server 105). The processor 130C of the verification server 110 may process the registration request in accordance with the following blocks of the process 200.

At decision block 210, the verification server 110 determines whether the third-party link can be validated. Validating the third-party link may include determining that the third-party server 105 is managed by a trusted entity and that the third-party server 105 complies with various security protocols and policies. The processor 130C of the verification server 110 may validate the third-party link by evaluating the security certificate associated with the third-party server 105 to determine whether the security certificate is valid, determining that the third-party server 105 encrypts sensitive data and communications (i.e., does not send or store plaintext information), confirming that websites hosted by the third-party server 105 do not contain malware, etc. If the processor 130C cannot validate the third-party link, the process 200 may proceed to block 215. If the processor 130C is able to validate the third-party link, the process 200 may proceed to block 220.

At block 215, the verification server 110 rejects the registration request. The processor 130C may reject the registration request because the third-party link cannot be validated. Rejecting the registration request may include the processor 130C sending a rejection message to the user computer 100 via the communication network 115 or private network 120. The rejection message may be an electronic message informing the user of the user computer 100 that the third-party link cannot be verified. The rejection message may further inform the user that the user will not be able to use the third-party link in an email.

At block 220, the verification server 110 generates the unique code for the third-party link. The unique code may include any one or more of numbers, letters (uppercase and/or lowercase), and special characters. The processor 130C may randomly generate the unique code by, e.g., randomly select a combination of numbers, letters, and/or special characters. The processor 130C may generate the unique code to be a predetermined length (i.e., a predetermined number of characters). Rather than randomly generate the unique code, the processor 130C may generate the unique code as a function of the third-party link. For instance, the processor 130C may apply a cryptographic function to the third-party link and use the output of the function as the unique code. As a result, the unique code may look like the following: "nw57VI7o3ZZNM4." The process 200 may proceed to block 225 after the unique code is generated.

At block 225, the verification server 110 generates the custom link. The custom link is a URL based on, or that otherwise includes, the unique code. The processor 130C may generate the custom link to include the domain of the entity that manages the verification server 110. If the verification server 110 is managed by BlackBerry Limited, the processor 130C may generate the following custom link: https://redirect.blackberry.com/nw57VI7o3ZZNM4. While the custom link uses the "blackberry.com" domain (an example of the "second domain" referenced above), it will redirect to the third-party link (e.g., the "first domain" referenced above) or the landing page created at block 230. One benefit of using the second domain (e.g., the domain of the entity that manages the verification server 110) is that the second domain is familiar to the user since it is the domain of the user's employer or another entity the user recognizes and trusts. With this approach, the email recipients will recognize the custom link in the email as originating from a source the verification server 110 has verified, giving the email recipient confidence that the email and the custom link are legitimate (e.g., not spam or part of a phishing attack).

At block 230, the verification server 110 creates the landing page. That is, the processor 130C may execute instructions that create the landing page using HTML, CSS, or the like. As previously explained, the landing page may include information about the entity that manages the third-party server 105, links to the third-party server 105, and possibly other information.

At block 235, the verification server 110 transmits the custom link to the user computer 100. The processor 130C may execute instructions that cause the verification server 110 to transmit the custom link to the user computer 100 via the communication network 115 or the private network 120. The processor 130C may permit the user computer 100 to include the custom link in emails generated by the user computer 100 and transmitted via the communication and/or the private network 120.

At decision block 240, the verification server 110 may monitor the third-party server 105 and determine whether to revoke the registration. The processor 130C may periodically reevaluate the validity of the third-party server 105 to determine whether the third-party server 105 continues to be managed by a trusted entity and continues to comply with various security protocols and policies. The processor 130C of the verification server 110 may reevaluate the security certificates associated with the third-party server 105, confirm whether the third-party server 105 continues to encrypt sensitive data, confirm whether websites hosted by the third-party server 105 continue to not contain malware, confirm whether the third-party server 105 has been compromised since the third-party server 105 was initially verified, etc. Another possibility is that the processor 130C may determine that the third-party link no longer links to the desired website. If the processor 130C determines that the third-party link is no longer valid, the process 200 may proceed to block 245 so that the registration of the third-party link may be revoked or updated. If the processor 130C is able to confirm that the third-party link remains verified, the process 200 may repeat block 240 for a predetermined amount of time, such as until the custom link expires. The processor 130C may wait a predetermined amount of time before subsequently executing block 240. For instance, the processor 130C may only execute block 240 once per day, one per hour, etc.

At block 245, the verification server 110 revokes or alters the registration and updates the landing page to reflect the revocation or alteration of the third-party link registration. In instances where the third-party link no longer links to the desired website, the processor 130C may execute instructions that cause the verification server 110 to update the landing page to remove the third-party link or to update the link on the landing page to the appropriate page hosted on the third-party server 105. In instances where the third-party server 105 has been compromised or no longer meets the requisite security policy or protocols, the processor 130C may remove the landing page (or update the landing page to remove the third-party link or otherwise reflect that the third-party link is no longer registered), block the user computer 100 from accessing the third-party server 105 via the communication network 115, or both.

The concept described above may have other implementations beyond registering and attaching links to email recipients within an organization. For example, the user computer 100 may be a vehicle computer (i.e., a computer in an automobile) in communication with the verification server 110 via a vehicle telematics unit. Data transmitted from the vehicle may be transmitted to custom links after third-party links are registered with the verification server 110. The third-party links may be associated with applications, hosted on or communicating with a third-party server 105, running on a vehicle infotainment system. Registering the third-party links may be part of the process for approving third-party applications to run on the vehicle infotainment system.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A verification server comprising:
a memory; and
a processor programmed to execute instructions stored in the memory, the instructions including receiving a link registration request including a third-party link to a third-party domain, validating the third-party domain as a result of receiving the link registration request, generating a randomly generated unique code as a result of validating the third-party domain, generating a custom link that includes a second domain that differs from the third-party domain, wherein the randomly generated unique code is appended to the second domain, and periodically reevaluating validity of the third-party domain at predetermined time intervals, wherein the periodically reevaluating includes periodically confirming, by the verification server, that data sent from the third-party domain is encrypted, wherein the second domain is associated with an entity managing the verification server.

2. The verification server of claim 1, wherein generating the randomly generated unique code includes generating the randomly generated unique code as a function of the third-party link.

3. The verification server of claim 1, the instructions further including generating a landing page.

4. The verification server of claim 3, wherein generating the landing page includes generating the landing page to include information about the third-party domain.

5. The verification server of claim 3, wherein the custom link points to the landing page.

6. The verification server of claim 1, wherein the custom link points to the third-party domain.

7. The verification server of claim 1, the instructions further including transmitting the custom link to a user computer that transmitted the link registration request.

8. The verification server of claim 1, the instructions further including:
   revoking registration of the third-party link as a result of the periodically reevaluating the validity of the third-party domain.

9. The verification server of claim 8, the instructions further including:
   generating a landing page after validating the third-party domain and before the periodically reevaluating the validity of the third-party domain; and
   updating the landing page as a result of revoking registration of the third-party link.

10. The verification server of claim 9, wherein updating the landing page as a result of revoking registration of the third-party link includes removing the landing page.

11. The verification server of claim 9, wherein updating the landing page as a result of revoking registration of the third-party link includes updating the landing page to indicate that the third-party link is no longer registered.

12. The verification server of claim 9, wherein updating the landing page as a result of revoking registration of the third-party link includes removing the third-party link from the landing page.

13. A method comprising:
   receiving a link registration request including a third-party link to a third-party domain;
   validating the third-party domain as a result of receiving the link registration request;
   generating a randomly generated unique code as a result of validating the third-party domain;
   generating a custom link that includes a second domain that differs from the third-party domain, wherein the randomly generated unique code is appended to the second domain; and
   periodically reevaluating validity of the third-party domain at predetermined time intervals, wherein the periodically reevaluating includes periodically confirming, by a verification server, that data sent from the third-party domain is encrypted, wherein the second domain is associated with an entity managing the verification server.

14. The method of claim 13, further including generating a landing page that includes information about the third-party domain including the third-party link.

15. The method of claim 14, wherein the custom link points to the landing page.

16. The method of claim 13, further including transmitting the custom link to a user computer that transmitted the link registration request.

17. The method of claim 13, further including:
   revoking registration of the third-party link as a result of the periodically reevaluating the validity of the third-party domain.

* * * * *